United States Patent
Wang et al.

(10) Patent No.: US 10,487,371 B2
(45) Date of Patent: Nov. 26, 2019

(54) TRIPOD UNIVERSAL JOINT FAIRWAY HEAT TREATMENT DEVICE AND HEAT TREATMENT METHOD

(71) Applicant: Zhejiang ODM Transmission Technology Co., Ltd, Jiaxing (CN)

(72) Inventors: Lijun Wang, Jiaxing (CN); Weikai Wang, Jiaxing (CN); Yousheng Fan, Jiaxing (CN); Lei Lu, Jiaxing (CN); Baibin Ma, Jiaxing (CN); Lingyi Zeng, Jiaxing (CN)

(73) Assignee: Zhejiang ODM Transmission Technology Co., Ltd, Jiaxing (CN)

( * ) Notice: Subject to any disclaimer, the term of this patent is extended or adjusted under 35 U.S.C. 154(b) by 240 days.

(21) Appl. No.: 15/677,002

(22) Filed: Aug. 14, 2017

(65) Prior Publication Data

US 2018/0112283 A1    Apr. 26, 2018

(30) Foreign Application Priority Data

Oct. 20, 2016    (CN) .......................... 2016 1 0917292

(51) Int. Cl.
*C21D 9/00*    (2006.01)
*C21D 1/42*    (2006.01)
*C21D 1/667*    (2006.01)

(52) U.S. Cl.
CPC ............. *C21D 9/0068* (2013.01); *C21D 1/42* (2013.01); *C21D 1/667* (2013.01)

(58) Field of Classification Search
CPC ......... C21D 9/0068; C21D 1/667; C21D 1/42
See application file for complete search history.

(56) References Cited

U.S. PATENT DOCUMENTS

| 3,769,700 | A | * | 11/1973 | Andrianov | .......... | H01F 41/0206 |
| | | | | | | 29/607 |
| 2014/0246423 | A1 | * | 9/2014 | Shimasawa | ............ | H05B 6/101 |
| | | | | | | 29/606 |
| 2018/0112283 | A1 | * | 4/2018 | Wang | ....................... | C21D 1/42 |

FOREIGN PATENT DOCUMENTS

| CN | 2777671 | Y | 5/2006 |
| CN | 202009508 | U | 10/2011 |
| CN | 203397855 | U | 1/2014 |
| CN | 204022876 | U | 12/2014 |
| JP | 2003133037 | A | 5/2003 |

* cited by examiner

*Primary Examiner* — Scott R Kastler
(74) *Attorney, Agent, or Firm* — Wayne & Ken, LLC; Tony Hom

(57) ABSTRACT

The present disclosure discloses a tripod universal joint fairway heat treatment device. A magnetizer includes a middle induction area and two-end induction areas, wherein the middle induction area includes magnetic conductive sheets stacked together; and the two-end induction areas include magnetic conductive sheets and magnetic conductive insulation sheets crosswise stacked together. Controllable deformation of an inner cavity fairway of a tripod universal joint during intermediate frequency quenching is realized by changing an arrangement form of the magnetic conductive sheets in the magnetizer, thereby avoiding a condition that three pivot shafts and bearing rings cannot be installed due to excessive deformation at a fairway opening after quenching, and greatly improving a qualified rate of products and safety performance of the products during use.

8 Claims, 19 Drawing Sheets

TRIPOD UNIVERSAL JOINT FAIRWAY HEAT TREATMENT DEVICE AND HEAT TREATMENT METHOD

TECHNICAL FIELD

The present invention relates to the field of heat treatment, and more specifically, to a tripod universal joint fairway heat treatment device and a heat treatment method.

BACKGROUND OF THE INVENTION

A constant velocity universal joint for automobiles, as an important member for connecting and transmitting a driving shaft between an output shaft of a gearbox and a wheel hub, can be classified into a fixed constant velocity universal joint and a telescopic sliding constant velocity universal joint according to operating properties of the universal joint. A tripod universal joint is one of the most common forms in the telescopic sliding constant velocity universal joint.

The tripod universal joint is composed of a three-column groove shell, a retainer ring, bearing rings, roller pins and a tripod. A main function of the tripod universal joint is to connect two shafts between which an included angle is formed or of which mutual positions are changed, so that the two shafts transmit power at the same angular velocity and have a certain displacement capacity in an axial direction.

The tripod is composed of three pin shafts with an included angle of 120 degrees. The bearing rings are mounted on the pin shafts through the roller pins. Three chutes (fairways) along an axial direction of the groove shell are formed at an inner cavity of the three-column groove shell, and the three-column groove shell is installed in coordination with the three bearing rings and can be axially moved along the chutes. When a certain pivot angle exists between the three-column groove shell and the tripod, after a certain torque is applied to the three-column groove shell, the torque is transferred to the tripod by the bearing rings so as to drive the tripod to rotate. The tripod slides in and out along an axis of the three-column groove shell in a steering travel process to compensate an axial length change of the universal joint.

Based on friction and extrusion caused by the bearing rings and the chutes in a relative motion process, contact surfaces of the chutes and the bearing rings of the tripod universal joint are easy to be worn and deformed, so surface hardness and wear resistance of the contact surfaces are improved in a manner of performing heat treatment on a metal surface. The chutes in the inner cavity of the three-column groove shell are often subjected to heat treatment in an intermediate frequency quenching manner in a current industry.

Heat treatment to the inner cavity of the tripod universal joint above is performed in the intermediate frequency quenching manner for improving the mechanical property of a friction surface. Technical needs after heat treatment of the universal joint can be met in improvement of material hardness and wear resistance in an existing technical solution. However, an intermediate frequency quenching principle determines that a material after heat treatment may cause a deformation phenomenon. The intermediate frequency quenching causes deformation for two main reasons: (1) an internal structure of the material is transformed from austenite to martensite after the intermediate frequency quenching, and a specific volume of the martensite is larger than that of the austenite, so an operation of performing intermediate frequency quenching and cooling on a workpiece is a volume expansion process, called as specific volume deformation; and (2) different heat expansion and cold contraction degrees are caused due to non-uniform heating and cooling in the heat treatment process, an internal stress is further produced, and deformation produced by the internal stress is called internal stress plastic deformation.

In an ideal state, an inner outline of a section of the chutes of the tripod universal joint is of an inverted olive shape, namely, sizes of an opening and a bottom are larger, while a size of a middle is smaller. This structure is favorable for smoothly mounting the bearing rings into the chutes and can ensure that the tripod has a certain motion amount along the chutes.

Inclination of the chutes should be less than 0.02, that is, the chutes are in a shape of a horn, after the tripod universal joint is finished. According to past experience, the deformation produced after the intermediate frequency quenching may cause that the inner outline of the section of the chutes presents an olive shape with a slightly bulged middle and two narrow ends.

In the industry, an opening area of each chute is called section a, an intermediate working area is called section b, and a bottom area is called section c. In order to guarantee convenient installation and reliable transmission, a groove width of the section a and a groove width of the section c are generally required to be less than a groove width of the section b. An assembling clearance size of the section b of each chute and each bearing ring is controlled to be 0.08 mm-0.18 mm. A problem brought by deformation of the inner cavity is that the three bearing rings cannot be installed into the chutes according to set sizes, so an outer diameter of each bearing ring needs to be polished to be small enough to pass through the section a area of the opening before the bearing ring is assembled. However, a problem brought by this manner is that an assembling clearance between the polished bearing ring and the section b working area is too large and exceeds a reasonable range. In a loading travel process, abnormal sound and vibration during transmission are caused due to too large clearances between the bearing rings and the chutes of the universal joint, and even premature failure of the universal joint may be caused after a long time.

At present, the universal joint often presents an olive structure with the slightly bulged middle and two narrow ends after the intermediate frequency quenching, while the olive structure is far different from the expected inverted olive structure. Because deformation after intermediate frequency quenching is related to intensity of a generated alternating magnetic field, the deformation herein after the intermediate frequency quenching may be correspondingly weakened as long as intensity of a certain magnetic field is weakened theoretically. Because a quenching inductor generates an alternating magnetic field by powering an induction coil by alternating current, the generated alternating magnetic field forms high-density induction current (eddy current) on the surface of the workpiece through an "induction heating principle", and the formed induction current is changed into heat energy for heating the workpiece. For a tripod universal joint fairway, heat treatment is performed only on a contact surface between the fairway and each bearing ring, instead of the whole inner cavity, so silicon steel sheets need to be arranged at corresponding positions of the induction coil. The silicon steel sheets are "["-shaped metal sheets, and each quenching surface is formed by superposing a group of silicon steel sheets. By virtue of magnetic conductive properties of the silicon steel sheets, when the current passes through the silicon steel sheets, a self-induced electromotive force is high due to high magnetic flux density of a core, and the current is driven to an opening side with small inductive reactance, that is, one side needing to be quenched, so that only the quenching surfaces are quenched, instead of all surfaces of the inner cavity.

An existing intermediate frequency quenching inductor includes a base and a heating inductor mounted on the base. An opening positioning device for positioning an opening of the tripod universal joint is mounted on the base of the heating inductor and is used for determining a position of the tripod universal joint during heat treatment. After used for a long time, the opening positioning device is easily rubbed by the opening of the tripod universal joint and worn, and overall positioning accuracy of the tripod universal joint is reduced, so the bottom of the tripod universal joint fairway is contacted with inductor accessories and worn, causing that the tripod universal joint is directly contacted with an effective coil to generate ignition and a copper tube of the effective coil is broken, thereby shortening service life of the quenching inductor.

SUMMARY OF THE INVENTION

The present invention provides a tripod universal joint fairway heat treatment device, aiming at overcoming a defect in the prior art that deformation of a workpiece after quenching is uncontrollable.

In order to solve the technical problem above, a technical solution is adopted in the present invention as follows: a tripod universal joint fairway heat treatment device includes an effective coil, wherein a magnetizer is arranged on the effective coil and includes a middle induction area and two-end induction areas; the middle induction area is provided between the two-end induction areas and includes magnetic conductive sheets stacked together; and the two-end induction areas include magnetic conductive sheets and magnetic conductive insulation sheets crosswise stacked together.

Magnetic field intensity in the two-end induction areas is weakened by the magnetic conductive insulation sheets, so that magnetic lines of force in the two-end induction areas are sparse. In an actual using process, because magnetic fields at the opening and the bottom of the fairway are weakened, the deformation after quenching is correspondingly weakened, thereby achieving effects of increasing the deformation in the middle of the fairway and decreasing the deformation at the two ends.

In an optional solution, the quantity of the magnetic conductive insulation sheets stacked in the two-end induction areas is gradually decreased from one end of the two-end induction areas far away from the middle induction area to one end, close to the middle induction area of the two-end induction areas. According to the device, a thickness of a workpiece quench-hardening layer subjected to heat treatment is in smooth transition, and operational performance of the heat treatment device is optimized.

In an optional solution, the magnetic conductive sheets are silicon steel sheets, and the magnetic conductive insulation sheets are mica sheets. The magnetic conductive sheets and the magnetic conductive insulation sheets are low in construction cost and easily available, so manufacturing cost of the heat treatment device is reduced.

In an optional solution, the heat treatment device further includes a fixing plate, wherein an opening positioning water spraying ring is arranged on the fixing plate; a stainless steel positioning block is arranged on the opening positioning water spraying ring; and an upper surface of the stainless steel positioning block protrudes out of an upper surface of the opening positioning water spraying ring. A phenomenon that the effective coil is contacted with an inner cavity of a workpiece to generate ignition because metals on the surface of the opening positioning water spraying ring are excessively worn and a top of a rubber stick is further worn due to repeatedly machining and positioning of the opening positioning water spraying ring is avoided.

In an optional solution, a mounting groove for receiving the stainless steel positioning block is formed on the opening positioning water spraying ring, and the stainless steel positioning block is fixed in the mounting groove through screws. The stainless steel positioning block is firmly fixed and is convenient to assemble, thereby reducing manufacturing cost of the opening positioning water spraying ring.

In an optional solution, the opening positioning water spraying ring is hollow, and a water spraying opening is formed on the opening positioning water spraying ring. Due to a reasonable structure of the opening positioning water spraying ring, cooling performance of the opening positioning water spraying ring is optimized.

In an optional solution, lugs are integrally arranged on the opening positioning water spraying ring, and screws for fixing the opening positioning water spraying ring on the fixing plate are arranged on the lugs. Through arrangement of the lugs, the opening positioning water spraying ring is reliably fixed and does not need to be perforated during fixation, thereby optimizing sealing performance of the opening positioning water spraying ring.

In an optional solution, the heat treatment device further includes a positive busbar and a negative busbar, wherein the positive busbar and the negative busbar are electrically connected with the effective coil, and an insulation pad is arranged between the positive busbar and the negative busbar and has a thickness not less than 1 mm Therefore, the insulating property of the insulation pad is greatly optimized, and the stability performance of the heat treatment device in the using process is further improved.

In an optional solution, three effective coils are arranged, an included angle between every two adjacent effective coils is 120 degrees, the opening positioning water spraying ring is sleeved on the three effective coils and then fixed on the fixing plate, a rubber stick is also arranged on the fixing plate, the three effective coils are encircled to form a containing cavity for receiving the rubber stick, the rubber stick is hollow, and a water outlet is formed in the rubber stick. Three fairways can be simultaneously subjected to heat treatment by the three effective coils, thereby improving heat treatment efficiency of the heat treatment device. Through the arrangement of the rubber stick, fixing performance of the effective coils is improved. Moreover, because the water outlet is formed in the rubber stick, a structure of the heat treatment device is optimized and the operational performance of the heat treatment device is further optimized.

A heat treatment method adopting the tripod universal joint fairway heat treatment device above includes the following steps:

a. positioning a tripod universal joint on the heat treatment device;

b. supplying intermediate frequency alternating current of 5000 Hz-10000 Hz to the heat treatment device, and heating a surface of a workpiece to a temperature of 800° C.-850° C.; and c. spraying a quenching liquid to a quenching part of the tripod universal joint.

Compared with the prior art, the tripod universal joint fairway heat treatment device provided by the present invention has the following advantages that: a magnetizer includes the middle induction area and the two-end induction areas, wherein the middle induction area includes the magnetic conductive sheets stacked together; and the two-end induction areas include the magnetic conductive sheets and the magnetic conductive insulation sheets crosswise stacked together. Controllable deformation of an inner cavity fairway of the tripod universal joint during intermediate frequency quenching is realized by changing an arrangement form of the magnetic conductive sheets in the magnetizer, thereby avoiding a condition that three pivot shafts and bearing rings cannot be installed due to excessive deformation at a fairway opening after quenching, and greatly improving a qualified rate of products and safety performance of the products during use.

Compared with the prior art, the tripod universal joint fairway heat treatment method provided by the present invention has the following advantages that deformation of each part of the fairway can be effectively controlled when the tripod universal joint fairway is subjected to heat treatment, so that quenching quality of the fairway is greatly improved, and the tripod universal joint is convenient to be assembled during subsequent assembly.

DETAILED DESCRIPTION OF THE INVENTION

Figure 1:
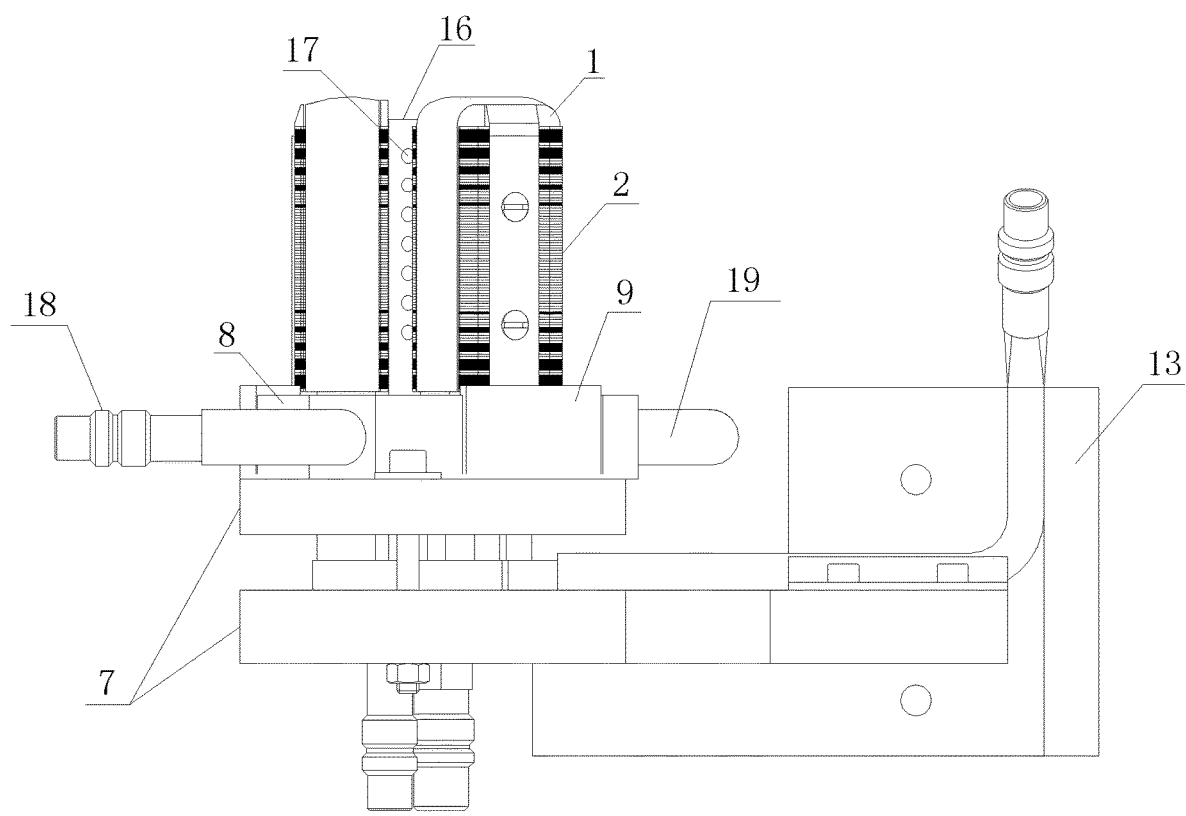
FIG. 1 is a front view of a tripod universal joint fairway heat treatment device in the present invention.
Figure 2:
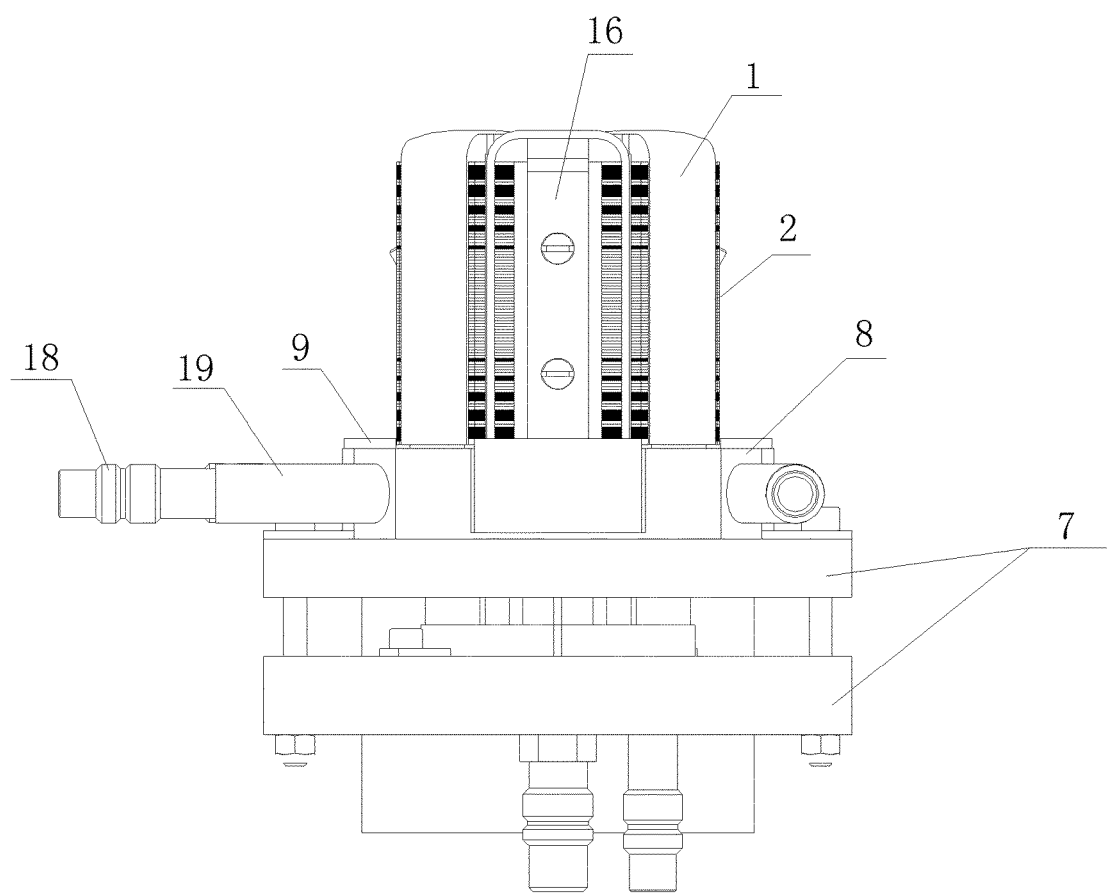
FIG. 2 is a left view of FIG. 1.

A principle of an intermediate frequency quenching inductor is that an alternating electromagnetic field is generated around an induction coil after a workpiece is arranged in the induction coil (that is, an effective coil 1) of the quenching inductor and the induction coil is powered by alternating current; and a conductor (workpiece) located in varying magnetic flux will be cut by magnetic lines of force in the alternating magnetic field. An electromotive force is generated on the workpiece according to an electromagnetic induction principle and is called an induced electromotive force e, and if the conductor is closed to form a circuit, the electromotive force may drive electrons to flow so as to form induction current, that is, eddy current i.

Eddy current intensity i is equal to e/z.

An impedance i is generally low, and i is naturally very high.

$Q=i^2Rt$ according to a Joule-Lenz's law, so that the eddy current circuit generates extremely high heat, and induction heating is performed by virtue of the heat mainly.

Because the magnetic lines of force formed on the effective coil 1 are of annular concentric circles and are scattered and the generated heat is not enough to heat the surface of the workpiece, silicon steel sheets are generally added on the effective coil 1. A purpose of adding the silicon steel sheets in the effective coil 1 is to lead ring current formed on the effective coil 1 to openings at two ends of the silicon steel sheets by virtue of magnetic conductive properties of the silicon steel sheets, thereby enhancing magnetic field intensity on opening sides of the silicon steel sheets. The opening sides of the silicon steel sheets are aligned at surfaces of to-be-heated workpiece. The heat generated by the enhanced magnetic field intensity is enough to reach a temperature needed during quenching of the workpiece.

A main representation form after quenching is a depth of a quench-hardening layer, and the depth of the quench-hardening layer is related to a frequency selected for quenching equipment and quenching time. Change of the quenching frequency or the quenching time only can wholly change the depth of the quench-hardening layer, but cannot change the depth of the quench-hardening layer in a certain area on the surface of the workpiece.

However, during heat treatment of a tripod universal joint fairway 100, deformation of an opening and a bottom of the fairway 100 needs to be small, and deformation of a middle of the fairway does not need to be controlled, so that the tripod universal joint is convenient to be assembled during subsequent assembly.

Intermediate frequency quenching is to perform heat treatment in a manner of heating the surface of the workpiece by virtue of the induction current, a heating temperature depends on the intensity of the induction current, and the induction current is related to the intensity of the generated alternating magnetic field and is enhanced along with enhancement of the magnetic field intensity. Therefore, in order to reduce an influence of the intermediate frequency quenching on the deformation of the workpiece, the intensity of the generated alternating magnetic field must be weakened.

Since the increased silicon steel sheets can change a magnetic field direction, the generated heat is indirectly changed. The higher the heating temperature is, the larger the depth of the formed quench-hardening layer is if other conditions are invariable. Therefore, a purpose of changing the depth of the quench-hardening layer in a certain area on the surface of the workpiece can be achieved by changing an arrangement form of the silicon steel sheets in the effective coil 1, that is, the magnetic field intensity in the area is reduced in a manner of replacing the silicon steel sheets with the insulation sheets in an area in which deformation needs to be decreased, and the heating temperature in the area is correspondingly reduced, thereby reducing the depth of the quench-hardening layer generated in the area.

The silicon steel sheets superposed in groups are arranged on each effective coil 1 of the quenching inductor of the tripod universal joint fairway 100, so the magnetic lines of force in a novel alternating magnetic field formed due to magnetic conductive actions of the silicon steel sheets are uniform in distribution, and are erected on the openings of the silicon steel sheets in a shape of concentric arcs superposed with one another, and the depth of the quenched quench-hardening layer is uniform. Therefore, the deformation after quenching cannot meet preset structural requirements.

Thus, part of the silicon steel sheets can be replaced with mica sheets on the inductor opposite to opening and bottom positions of the fairway 100, and the magnetic lines of force of the formed alternating magnetic field after improvement are also of a shape of the concentric arcs superposed with one another. A difference is that the distribution of the middle magnetic lines of force is uniform and the distribution of the magnetic lines of force at two ends is sparse because partial magnetic field intensity is weakened by the mica sheets. Therefore, the deformation after quenching is correspondingly weakened due to the weakened magnetic field at the opening and bottom in the actual using process, thereby achieving technical effects of maintaining the deformation in the middle of the fairway 100 invariable and decreasing the deformation at the two ends of the fairway 100 of the tripod universal joint during quenching.

Embodiment I

A tripod universal joint fairway heat treatment device in the present invention is further described below in combination with drawings. As shown in FIG. 1, FIG. 2, FIG. 3, FIG. 4, FIG. 5 and FIG. 6, the tripod universal joint fairway heat treatment device includes a fixing plate 7, effective coils 1, a magnetizer 2, opening positioning water spraying rings 8, a positive busbar 13 and a negative busbar 14.

Figure 4:
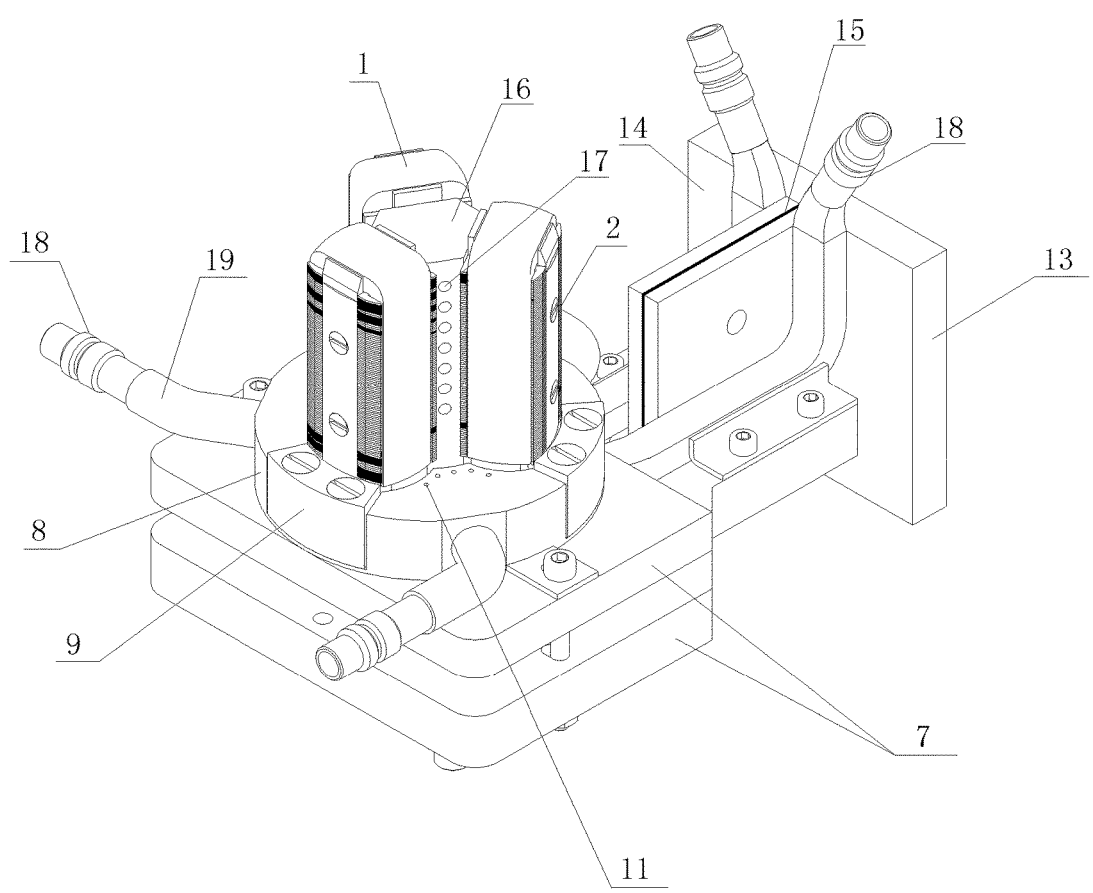
FIG. 4 is an axonometric drawing of a tripod universal joint fairway heat treatment device in the present invention.
Figure 5:
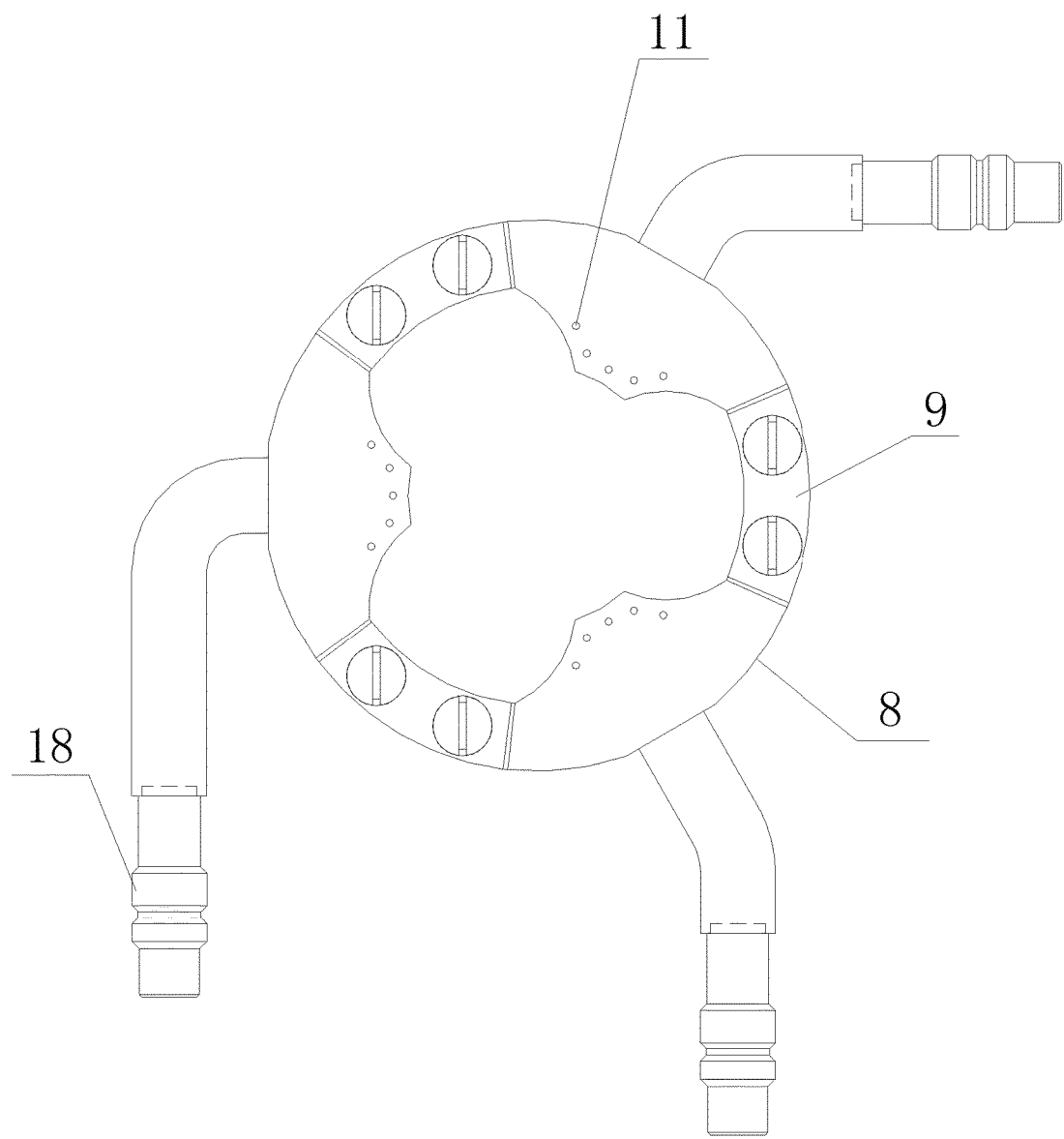
FIG. 5 is a top view of an opening positioning water spraying ring in a tripod universal joint fairway heat treatment device in the present invention.
Figure 6:
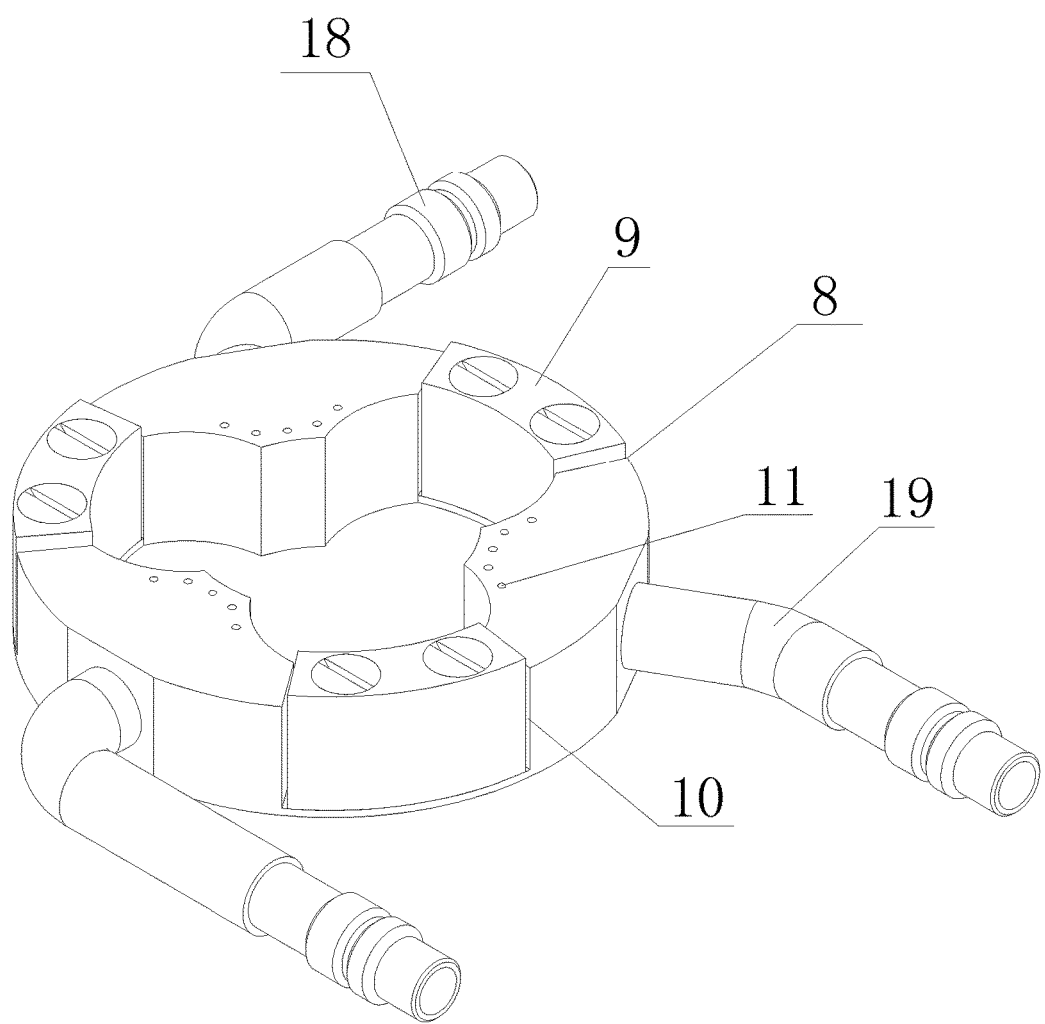
FIG. 6 is an axonometric drawing of an opening positioning water spraying ring in a tripod universal joint fairway heat treatment device in the present invention.
Figure 7:
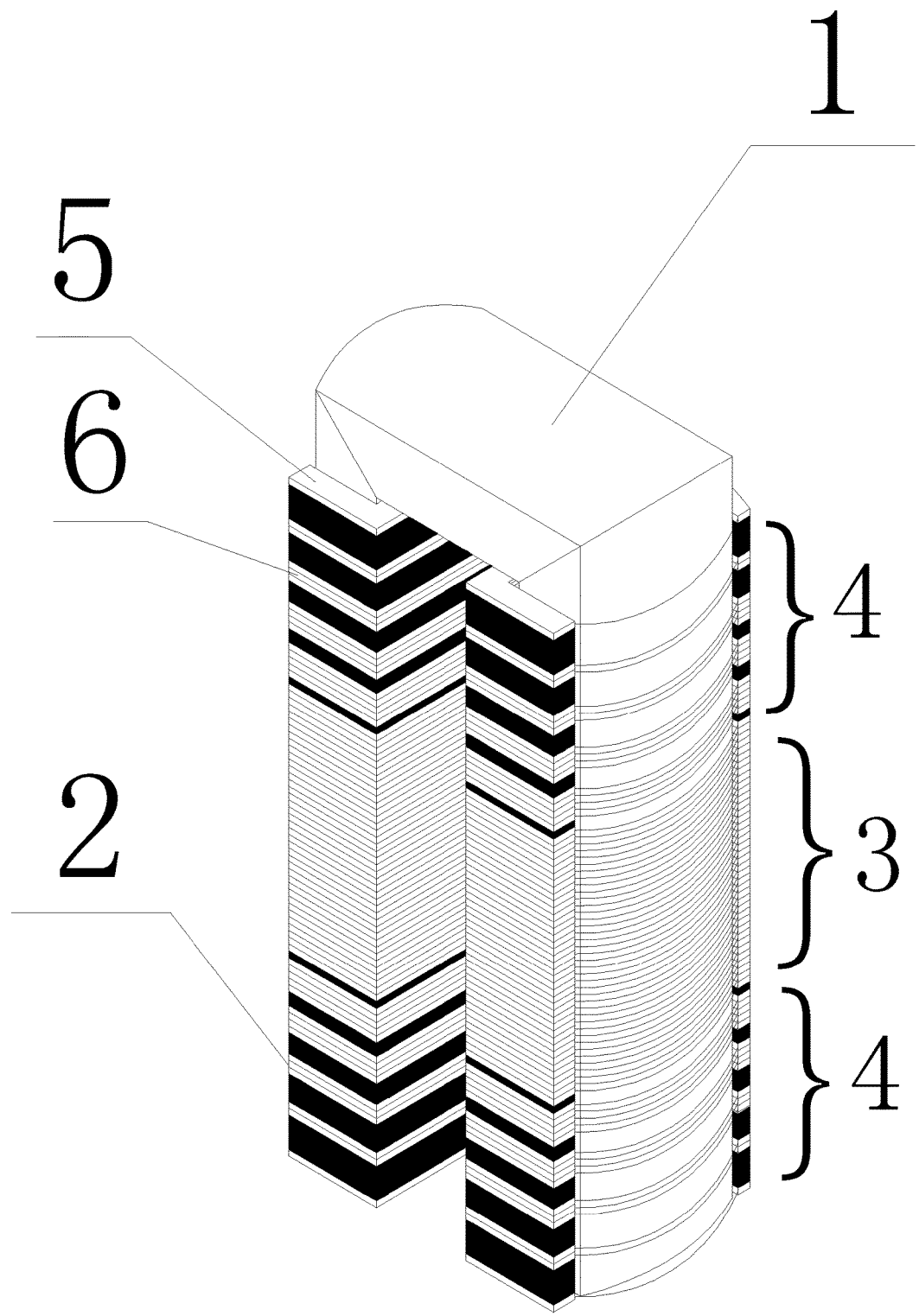
FIG. 7 is a schematic diagram of a stacking state of magnetic conductive sheets and magnetic conductive insulation sheets in two-end induction areas in the present invention.
Figure 8:
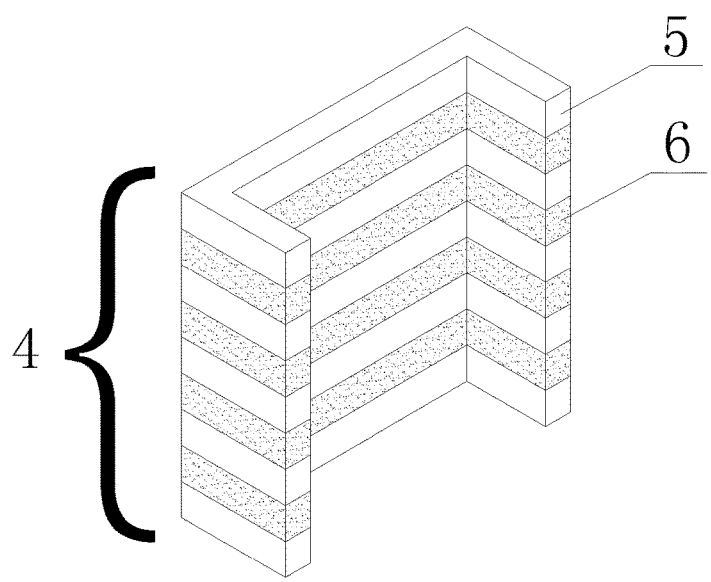
FIG. 8 is a schematic diagram of another stacking state of magnetic conductive sheets and magnetic conductive insulation sheets in two-end induction areas in the present invention.

As shown in FIG. 4, FIG. 7 and FIG. 8, the magnetizer 2 and magnetic conductive insulation sheets 6 are arranged on the effective coils 1; three effective coils 1 are arranged; an included angle between every two adjacent effective coils 1 is 120 degrees; a rubber stick 16 is also arranged on the fixing plate 7; the three effective coils 1 are encircled to form a containing cavity for receiving the rubber stick 16; the rubber stick 16 is of a hollow structure; a water outlet 17 is formed in the rubber stick 16; and a shape of the effective coils 1 is a U shape with a downward opening.

The effective coils 1 are machined by red copper and matched with the tripod universal joint fairway 100, and six side surfaces of the tripod universal joint fairway 100 are specifically quenched, thereby increasing quenching efficiency and reducing energy consumption. An interior of each of the effective coils 1 is hollow and is used for circulating a cooling liquid to cool the effective coils 1.

As shown in FIG. 4, the rubber stick 16 is machined from a Teflon insulation board and has a hexagonal cross section. A fixing part for fixing the effective coils 1 is integrally arranged on three side surfaces of the rubber stick 16. The magnetic conductive sheets 5 and the magnetic conductive insulation sheets 6 can be assembled on the effective coils 1 due to a width of the fixing part. The water outlet 17 on the rubber stick 16 is used for cooling the quenching surfaces of fairway 100. A water inlet pipe 19 is connected to a bottom of the rubber stick 16. A quick-change connector 18 is arranged on the water inlet pipe 19.

As shown in FIG. 4, the heat treatment device further includes the positive busbar 13 and the negative busbar 14. The positive busbar 13 and the negative busbar 14 are electrically connected with the effective coils 1, and an insulation pad 15 is arranged between the positive busbar 13 and the negative busbar 14 and has a thickness not less than 1 mm.

The positive busbar 13 and the negative busbar 14 are made from red copper square plates and are electrically connected with a secondary coil of a transformer. The insulation pad 15 is made of a mica plate and achieves an insulating effect, thereby avoiding a short circuit caused by contact between the positive busbar 13 and the negative busbar 14.

The transformer supplies power to the effective coils 1 through the positive busbar 13 and the negative busbar 14 so as to heat the tripod universal joint.

As shown in FIG. 7 and FIG. 8, the magnetizer 2 includes a middle induction area 3 and two-end induction areas 4. The middle induction area 3 is located between the two-end induction areas 4 and includes the magnetic conductive sheets stacked together. The two-end induction areas 4 include the magnetic conductive sheets 5 and magnetic conductive insulation sheets 6 crosswise stacked together. Refer to the prior art for a fixing manner of the magnetic conductive sheets 5 on the effective coils 1. A fixing manner of the magnetic conductive insulation sheets 6 refers to that of the magnetic conductive sheets 5. An arrangement manner of the magnetic conductive sheets 5 in the middle induction area 3 is the same as that of the prior art. The magnetic conductive sheets 5 and the magnetic conductive insulation sheets 6 in the two-end induction areas 4 are crosswise stacked.

As shown in FIG. 8, cross stacking of the magnetic conductive sheets 5 and the magnetic conductive insulation sheets 6 is to mix and stack the magnetic conductive sheets 5 and the magnetic conductive insulation sheets 6 together. A specific arrangement manner of the magnetic conductive insulation sheets 6 may be as follows: the magnetic conductive sheets 5 are stacked on two sides of each of the magnetic conductive insulation sheets 6. According to the stacking manner, the distribution of the magnetic lines of force on the two-end induction areas 4 is uniform, and a depth of a quench-hardening layer obtained by heating a workpiece on the two-end induction areas 4 is uniform.

As shown in FIG. 7, with respect to assembly needs of the tripod universal joint, the quench-hardening layers obtained by heating in the two-end induction areas 4 and the middle induction area 3 should be in smooth transition to conveniently assemble the tripod universal joint. A stacking manner of the magnetic conductive sheets 5 and the magnetic conductive insulation sheets 6 may also be as follows: the quantity of the magnetic conductive insulation sheets 6 stacked in the two-end induction areas 4 is gradually decreased from one end, far away from the middle induction area 3, of the two-end induction areas 4 to one end, close to the middle induction area 3, of the two-end induction areas 4.

For convenient description, one end, far away from the middle induction area 3, of the two-end induction areas 4 is defined as a first end, and one end, close to the middle induction area 3, of the two-end induction areas 4 is defined as a second end. The magnetic conductive sheets 5 in the two-end induction areas 4 are stacked together to form magnetic conductive groups, and the magnetic conductive insulation sheets 6 in the two-end induction areas 4 are stacked together to form insulation groups. A plurality of magnetic conductive groups and insulation groups are crosswise stacked together to form the two-end induction areas 4, and the magnetic conductive groups can be positioned between the two insulation groups. The quantity of the magnetic conductive insulation sheets 6 stacked in the two-end induction areas 4 is gradually decreased from one end, far away from the middle induction area 3, of the two-end induction areas 4 to one end, close to the middle induction area 3, of the two-end induction areas 4, which means that: the quantity of the magnetic conductive insulation sheets 6 positioned in the insulation groups formed in the two-end induction areas 4 is gradually decreased from the first end to the second end, and the quantity of the magnetic conductive insulation sheets 6 forming the insulation groups can be arranged according to an arithmetic sequence. For example, an insulation group farthest away from the middle induction area 3 includes ten magnetic conductive insulation sheets 6; the closer to the middle induction area 3 the insulation groups are, the smaller the quantity of the magnetic conductive insulation sheets 6 is, sequentially 8, 6, 4 and 2; and the quantity of the magnetic conductive sheets 5 included in the magnetic conductive group positioned between two insulation groups is not limited and can be freely selected.

In an actual using process of the two-end induction areas 4 obtained by this arrangement manner, the distribution of the magnetic lines of force is gradually dense from the first end to the second end, and the depth of the quench-hardening layer obtained by heating in the two-end induction areas 4 is in smooth transition with the depth of the quench-hardening layer obtained by heating in the middle induction area 3, thereby optimizing operational performance of the inductor.

The magnetic conductive sheets 5 are silicon steel sheets. The magnetic conductive insulation sheets 6 are mica sheets. The materials are easily available, thereby reducing production cost of the heat treatment device. Lengths of the two-end induction areas 4 are selected according to actual needs, while the selection is a conventional selection for those skilled in the art. The lengths of the two-end induction areas 4 should meet a need of convenient assembly of the tripod universal joint. Those skilled in the art may freely select the lengths of the two-end induction areas 4 during specific implementation, which is not described in detail herein.

Figure 3:
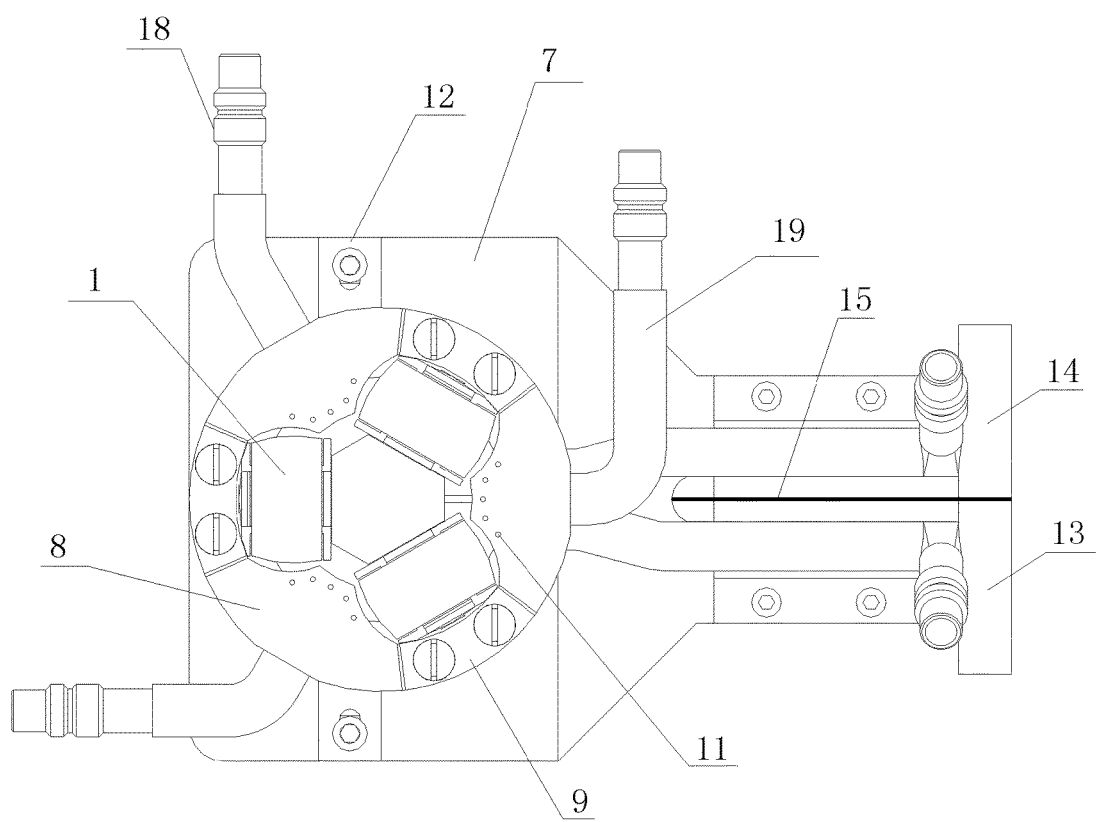
FIG. 3 is a top view of FIG. 1.

As shown in FIG. 3 and FIG. 4, the opening positioning water spraying ring 8 is arranged on the fixing plate 7 and is of a hollow structure. A water spraying opening 11 is formed on the opening positioning water spraying ring 8. Lugs 12 are integrally arranged on the opening positioning water spraying ring 8. Rib plates may be integrally arranged between the lugs 12 and the opening positioning water spraying ring 8 to improve strength of the opening positioning water spraying ring 8. Screws for fixing the opening positioning water spraying ring 8 on the fixing plate 7 are arranged on the lugs 12. The opening positioning water spraying ring 8 is sleeved on the effective coils 1 and then fixed on the fixing plate 7. The opening positioning water spraying ring 8 is connected with the water inlet pipe 19, and a quick-change connector 18 is arranged on the water inlet pipe 19.

The heat treatment device should include a plurality of water inlet pipes 19. The quick-change connector 18 should be arranged on each of the water inlet pipes 19. All the water inlet pipes 19 are used for conveying the quenching liquid. The quick-change connectors 18 are made of brass.

During specific implementation of the technical solution above, the fairway 100 of the tripod universal joint is matched with the effective coils 1; then, power is supplied to the effective coils 1 by the transformer to heat the tripod universal joint; and after the fairway 100 is heated to a corresponding quenching temperature, the quenching liquid is supplied by the water inlet pipes 19 to cool the surface of the fairway 100.

As shown in FIG. 9a, FIG. 9b, FIG. 9c, FIG. 9d, FIG. 9e, FIG. 9f, FIG. 9g, FIG. 9h, FIG. 10, FIG. 11 and FIG. 12, tripod universal joint samples which are not quenched by the heat treatment device above are collected in order to verify an implementation effect of the technical solution above. In addition, tripod universal joint samples quenched by the treatment device disclosed in the present application are collected; groove widths of three measuring points such as the opening, the middle and the bottom of each of three fairways 100 on each sample before and after quenching are measured by using a dial indicator; and variation of the groove widths before and after quenching is the deformation brought by quenching. In this way, data of nine deformations can be measured on one sample.

Figure 10:
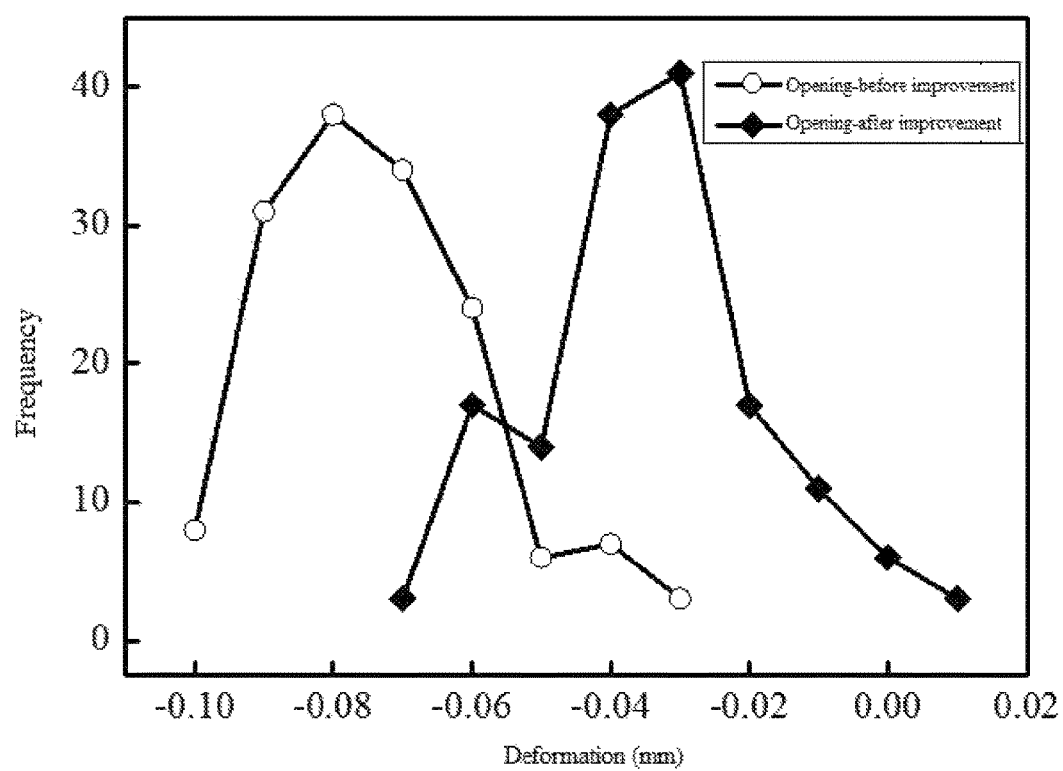
FIG. 10 is a curve chart of data at a sample detection opening.

Opening data measured on the samples is tabulated to obtain FIG. 10.

Opening-before improvement refers to data of the samples which are not quenched by the heat treatment device disclosed in the present application.

Opening-after improvement refers to data of the samples quenched by the heat treatment device disclosed in the present application.

Figure 9A:
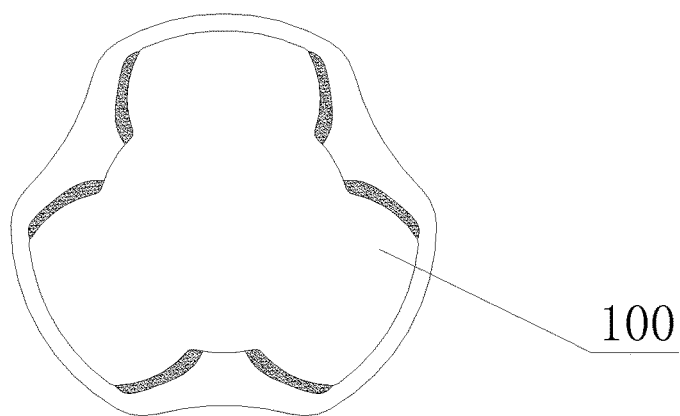
FIG. 9a is a schematic diagram of an opening quench-hardening layer after quenching a tripod universal joint fairway in the prior art.
Figure 9B:
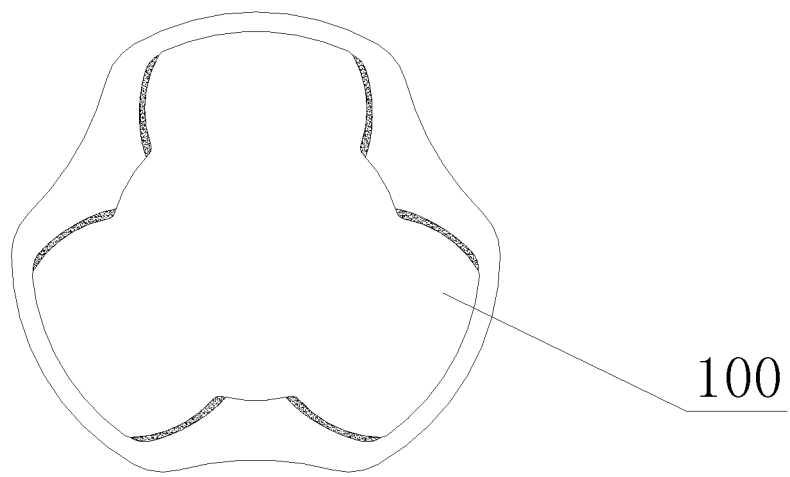
FIG. 9b is a schematic diagram of an opening quench-hardening layer after quenching a tripod universal joint fairway by adopting a heat treatment device in the present invention.

As shown in FIG. 9a, FIG. 9b and FIG. 10, deformation of the sample opening before improvement is distributed between −0.10 and −0.03, and lots of data appear in an area of −0.09 to −0.06. It can be seen from the data distribution condition that the deformation of the quenched opening of the tripod universal joint is wholly in a contraction trend before the intermediate frequency inductor is improved, and a contraction amount is great.

The deformation of the sample opening after improvement is distributed between −0.07 and 0.01, and lots of data are distributed in an area of −0.04 to −0.03. It is not hard to see that the deformation of the quenched opening of the fairway 100 of the tripod universal joint is also in the contraction trend after improvement, while the contraction amount is not obvious. The data after improvement is in an overall forward shift trend compared with the data before improvement.

Figure 11:
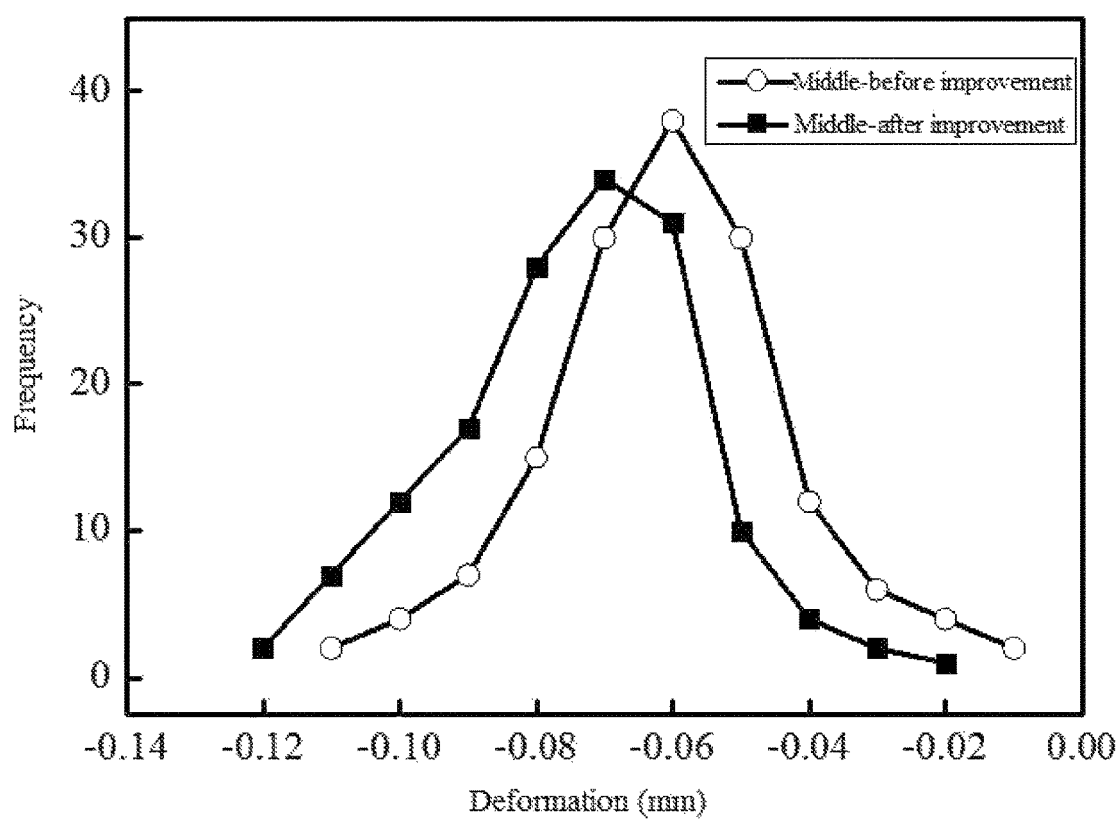
FIG. 11 is a curve chart of data at a sample detection middle.

Middle data measured on the samples is tabulated to obtain FIG. 11.

Middle-before improvement refers to data of the samples which are not quenched by the heat treatment device disclosed in the present application.

Middle-after improvement refers to data of the samples quenched by the heat treatment device disclosed in the present application.

The deformation after quenching before improvement is distributed between −0.11 and −0.01, and lots of data are distributed in an area of −0.07 to −0.05 and are wholly in a contraction trend.

Figure 9C:
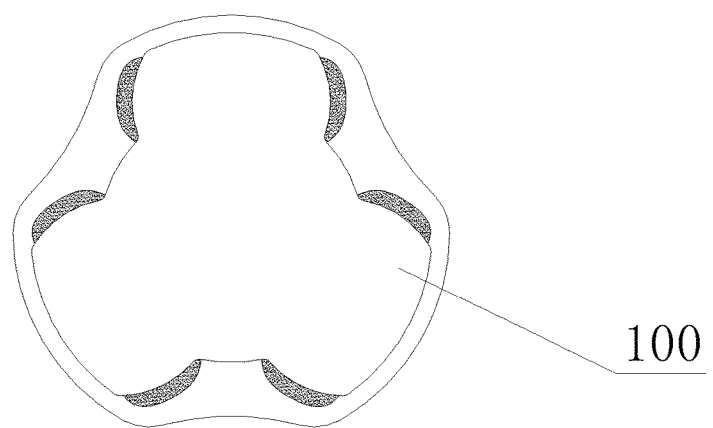
FIG. 9c is a schematic diagram of a middle quench-hardening layer after quenching a tripod universal joint fairway in the prior art.
Figure 9D:
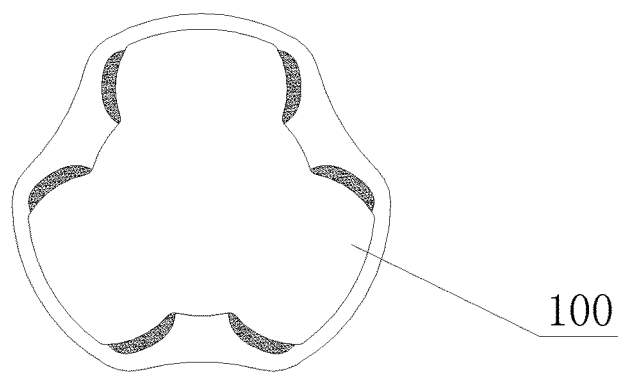
FIG. 9d is a schematic diagram of a middle quench-hardening layer after quenching a tripod universal joint fairway by adopting a heat treatment device in the present invention.

As shown in FIG. 9c, FIG. 9d and FIG. 11, the deformation of the samples after improvement is distributed between −0.12 and −0.02, and lots of data are distributed in an area of −0.08 to −0.06 and are wholly in a contraction trend. The contraction amount is a little greater than that of the opening. It is observed from data comparison of the deformation of the opening and the middle before and after improvement that the deformation of the middle of each fairway 100 after quenching before and after improvement is small.

Figure 12:
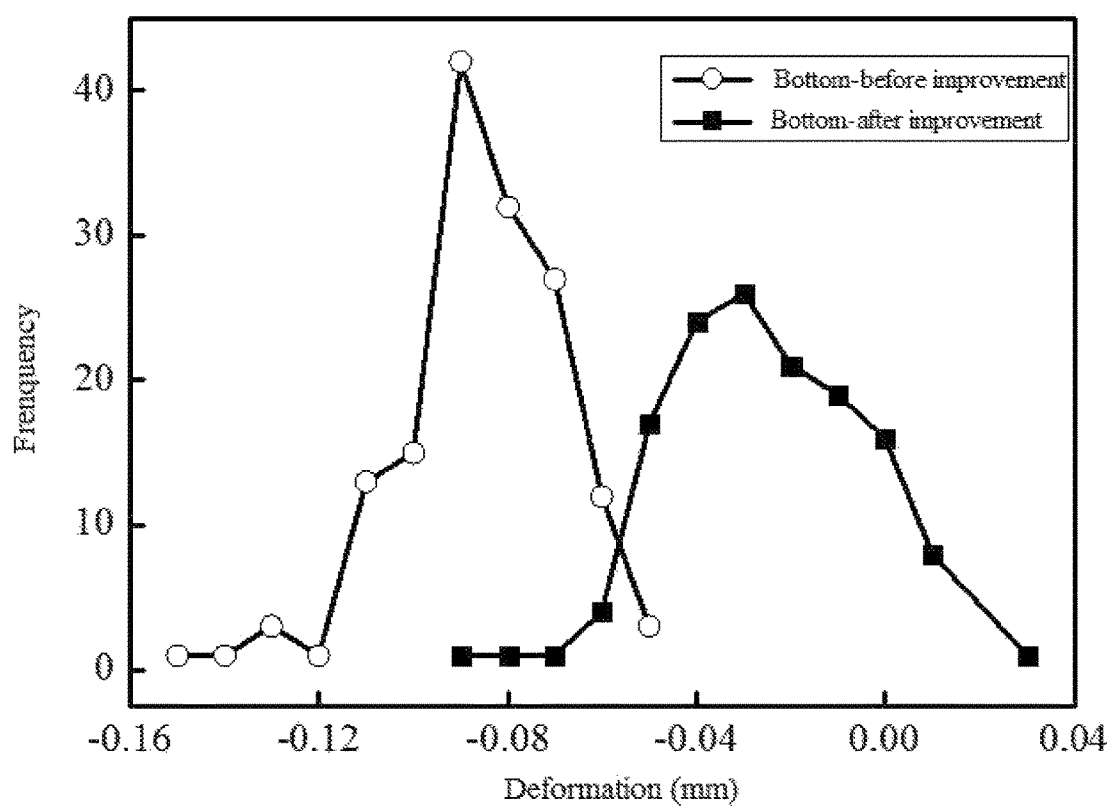
FIG. 12 is a curve chart of data at a sample detection bottom.

Bottom data measured on the samples is tabulated to obtain FIG. 12.

Bottom-before improvement refers to data of the samples which are not quenched by the heat treatment device disclosed in the present application; and Bottom-after improvement refers to data of the samples quenched by the heat treatment device disclosed in the present application.

Figure 9E:
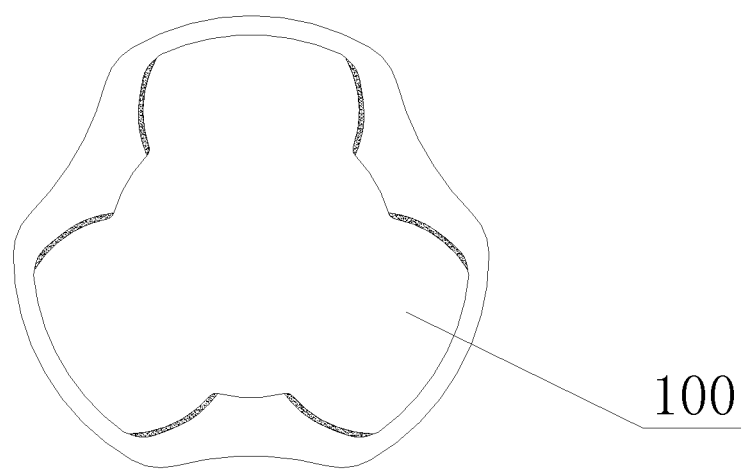
FIG. 9e is a schematic diagram of a bottom quench-hardening layer after quenching a tripod universal joint fairway in the prior art.
Figure 9F:
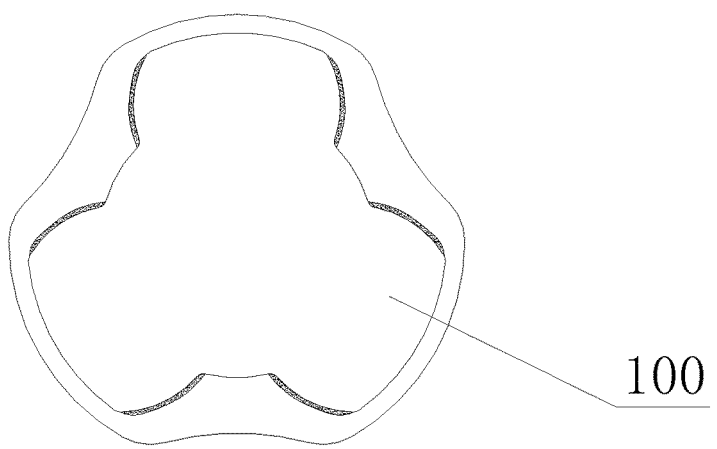
FIG. 9f is a schematic diagram of a bottom quench-hardening layer after quenching a tripod universal joint fairway by adopting a heat treatment device in the present invention.

As shown in FIG. 9e, FIG. 9f and FIG. 12, the deformation of the bottom of the samples before improvement is distributed between −0.15 and −0.03, and lots of data are distributed in an area of −0.09 to −0.07 and are wholly in a contraction trend.

The deformation of the bottom of the samples after improvement is distributed between −0.07 and −0.03, and the data most frequently appear in an interval of −0.03 to −0.02. It can be seen from the whole data distribution result that the deformation of the bottoms of the fairways 100 after improvement wholly presents a contraction phenomenon, but compared with the deformation before improvement, the contraction amount is obviously decreased.

Figure 9G:
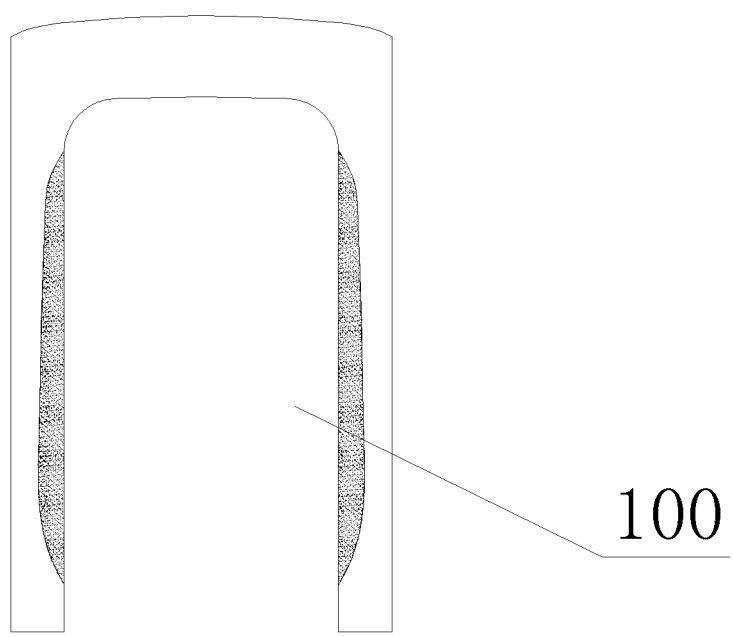
FIG. 9g is a sectional view of a quench-hardening layer after quenching a tripod universal joint fairway in the prior art.
Figure 9H:
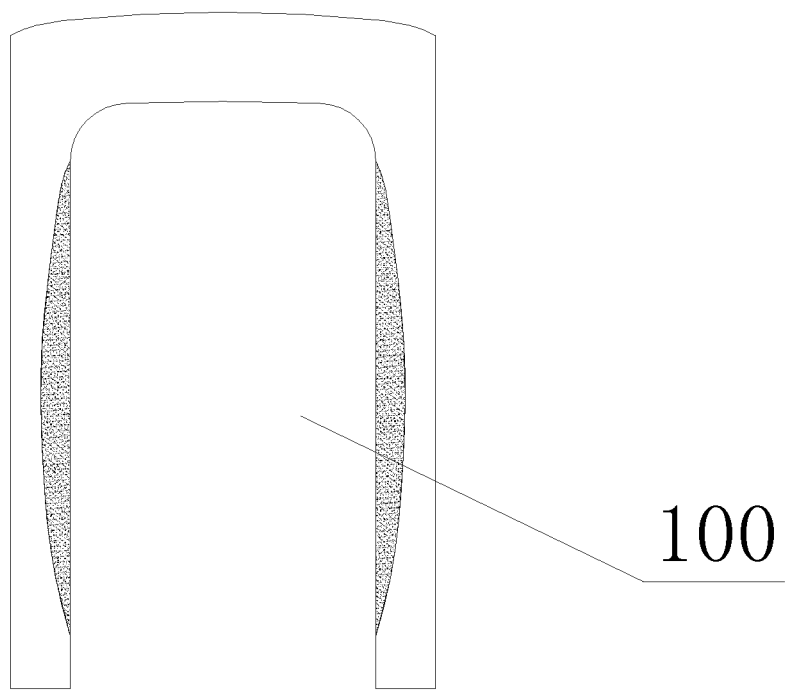
FIG. 9h is a sectional view of a quench-hardening layer after quenching a tripod universal joint fairway by adopting a heat treatment device in the present invention.

As shown in FIG. 9g and FIG. 9h, a purpose of controlling the deformation after the intermediate frequency quenching in the inner cavity of the tripod universal joint can be achieved by adding the mica sheets into the two-end induction areas 4.

Because some silicon steel sheets are replaced with the mica sheets in the two-end induction areas 4, the generated magnetic field is weakened, and after the fairways 100 of the tripod universal joint are quenched, the deformation produced at the two parts is decreased. It can be seen from the information reflected in FIG. 10 and FIG. 12 that the deformation is really decreased compared with that before improvement. Because the mica sheets are not arranged at corresponding parts of the middles of the fairways 100, the change of the deformation before and after improvement is small. It can be seen from the distribution conditions of three groups of data at the opening, the middle and the bottom after improvement, the contraction amount produced after deformation of the opening and the bottom is smaller than that produced by the deformation of the middle, that is, a purpose of controlling the deformation at the two ends of the fairways 100 is achieved, and the tripod universal joint is convenient in assembly.

Embodiment II

Differences of the present embodiment from embodiment I are as follows: a stainless steel positioning block 9 is arranged on the opening positioning water spraying ring 8; an upper surface of the stainless steel positioning block 9 protrudes out of an upper surface of the opening positioning water spraying ring 8; a mounting groove 10 for receiving the stainless steel positioning block 9 is formed on the opening positioning water spraying ring 8; and the stainless steel positioning block 9 is fixed in the mounting groove 10 through screws.

Totally three stainless steel supporting blocks are uniformly distributed on the opening positioning water spraying ring 8. Through the arrangement of the stainless steel supporting blocks, a phenomenon that the effective coils 1 are exposed and directly contacted with the inner cavity of the workpiece to generate ignition because metals on the surface of the opening positioning water spraying ring 8 are excessively worn and an upper edge of the rubber stick 16 is worn due to repeated machining and positioning of the opening positioning water spraying ring 8 can be avoided.

The magnetic conductive insulation sheets 6 in the technical solution above are punched by a punch press. Compared with traditional manual marking and cutting, the technical solution obviously improves machining efficiency, reduces labor intensity of workers and reduces production cost of the magnetic conductive insulation sheets 6.

A heat treatment method adopting the tripod universal joint fairway heat treatment device disclosed in the present application includes the following steps:
  a. positioning a tripod universal joint on the heat treatment device;
  b. supplying intermediate frequency alternating current of 5000 Hz-10000 Hz to the heat treatment device, and heating a surface of a workpiece to a temperature of 800° C.-850° C.; and
  c. spraying a quenching liquid to a quenching part of the tripod universal joint.

The fairways 100 are matched with the effective coils 1. The intermediate frequency alternating current of 5000 Hz-10000 Hz is introduced into the effective coils 1. The effective coils 1 generate an alternating electromagnetic field, and induction current of the same frequency, that is, eddy current, is induced by the alternating electromagnetic field again. The eddy current has a feature of centralizing on the surface of each of the fairways 100. Current density on the surface of each of the fairways 100 is high, and current inside each of the fairways 100 is close to zero, that is, a "skin effect". The surface of each of the fairways 100 can be rapidly heated to the temperature of 800° C.-850° C. within several seconds by utilizing the "skin effect". After a temperature of a heating layer exceeds a critical temperature of each of the fairways 100, the quenching liquid is rapidly sprayed to the quenching part, and a temperature of the quenching part is suddenly reduced, thereby achieving a quenching purpose.

The above only describes preferred embodiments of the present invention and is intended to reflect outstanding technical effects and advantages of the present invention, not to limit technical solutions of the present invention. Those skilled in the art should understand that all modified, changed or replaced technical features based on technical contents of the present invention should be included in a technical scope of appended claims in the present invention.

What is claimed is:

1. A tripod universal joint fairway heat treatment device, comprising:
    at least one effective coil (1), at least one magnetizer (2) arranged on the effective coil (1); the magnetizer (2) comprises a middle induction area (3) and two-end induction areas (4); the middle induction area (3) is provided between the two-end induction areas (4) and comprises magnetic conductive sheets (5) stacked together;
    and the two-end induction areas (4) comprise magnetic conductive sheets (5) and magnetic conductive insulation sheets (6) crosswise stacked together; wherein the quantity of the magnetic conductive insulation sheets (6) stacked in the two-end induction areas (4) is gradually decreased from one end of the two-end induction areas (4) far away from the middle induction area (3) to one end of the two-end induction areas (4) close to the middle induction area (3).

2. The tripod universal joint fairway heat treatment device according to claim 1, wherein the magnetic conductive sheets (5) are silicon steel sheets, and the magnetic conductive insulation sheets (6) are mica sheets.

3. The tripod universal joint fairway heat treatment device according to claim 2, wherein the heat treatment device further comprises a fixing plate (7); an opening positioning water spraying ring (8) is arranged on the fixing plate (7); a stainless steel positioning block (9) is arranged on the opening positioning water spraying ring (8); and an upper surface of the stainless steel positioning block (9) protrudes out of an upper surface of the opening positioning water spraying ring (8).

4. The tripod universal joint fairway heat treatment device according to claim 3, wherein a mounting groove (10) for receiving the stainless steel positioning block (9) is formed on the opening positioning water spraying ring (8), and the stainless steel positioning block (9) is fixed in the mounting groove (10) through screws.

5. The tripod universal joint fairway heat treatment device according to claim 4, wherein the opening positioning water spraying ring (8) is hollow, and a water spraying opening (11) is formed on the opening positioning water spraying ring (8).

6. The tripod universal joint fairway heat treatment device according to claim 3, wherein lugs (12) are integrally arranged on the opening positioning water spraying ring (8), and screws for fixing the opening positioning water spraying ring (8) on the fixing plate (7) are arranged on the lugs (12).

7. The tripod universal joint fairway heat treatment device according to claim 6, wherein the heat treatment device further comprises a positive busbar (13) and a negative busbar (14); the positive busbar (13) and the negative busbar (14) are electrically connected with the at least one effective coil (1); and an insulation pad (15) is arranged between the positive busbar (13) and the negative busbar (14); a thickness of the insulation pad (15) is no less than 1 mm.

8. The tripod universal joint fairway heat treatment device according to claim 7, wherein the number of the at least one effective coil (1) is three; an included angle between every two adjacent effective coils (1) is 120°; the opening positioning water spraying ring (8) is sleeved on the three effective coils (1) and then fixed on the fixing plate (7); a rubber stick (16) is also arranged on the fixing plate (7); the three effective coils (1) are encircled to form a containing cavity for receiving the rubber stick (16); the rubber stick (16) is hollow; and a water outlet (17) is formed on the rubber stick (16).

* * * * *